United States Patent [19]

Gall

[11] 3,873,236

[45] Mar. 25, 1975

[54] FAN WITH VARIABLE PITCH BLADES AND TRANSLATING BEARING ACTUATION SYSTEM

[75] Inventor: William Gall, West Chester, Ohio

[73] Assignee: General Electric Company, Cincinnati, Ohio

[22] Filed: Dec. 26, 1973

[21] Appl. No.: 428,079

[52] U.S. Cl.................. 416/162, 416/156, 416/168
[51] Int. Cl. ........................................... B64c 11/42
[58] Field of Search .......... 416/160, 162, 156, 157, 416/164, 166, 168, 159

[56] References Cited
UNITED STATES PATENTS

| | | | |
|---|---|---|---|
| 2,648,387 | 8/1953 | Doman | 416/168 X |
| 3,056,457 | 10/1962 | MacFarland | 416/166 |
| 3,216,507 | 11/1965 | Curioni | 416/157 |
| 3,487,880 | 1/1970 | Davies et al. | 416/157 |
| 3,549,272 | 12/1970 | Bauger et al. | 416/166 |
| 3,687,569 | 8/1972 | Klompas | 416/156 |

FOREIGN PATENTS OR APPLICATIONS

| | | | |
|---|---|---|---|
| 558,073 | 6/1957 | Belgium | 416/159 |
| 985,885 | 7/1951 | France | 416/166 |
| 1,012,580 | 7/1952 | France | 416/135 |
| 1,180,324 | 6/1959 | France | 416/157 |
| 846,622 | 8/1960 | United Kingdom | 416/157 |

OTHER PUBLICATIONS

A.P.C. Application Ser. No. 362,280; Published May 18, 1943; R. Praüse et al.

*Primary Examiner*—Everette A. Powell, Jr.
*Attorney, Agent, or Firm*—Derek P. Lawrence; Lee H. Sachs

[57] ABSTRACT

A fan having variable-pitch blades is driven by the core engine of a gas turbine. The blades are mounted to a disc for rotation of the blades about their respective axes and the disc is mounted to a fan shaft. The fan shaft is mounted for rotation by a casing. A plurality of track members are secured to the casing and each track member has a carriage mounted thereto for relative axial movement therebetween. A bearing has its outer race secured to the carriages, with its inner race cooperating through a plurality of link arms with the blades. Actuation means moves the carriages axially, the link arms changing the pitch of the blades in response to axial movement of the carriages.

10 Claims, 2 Drawing Figures

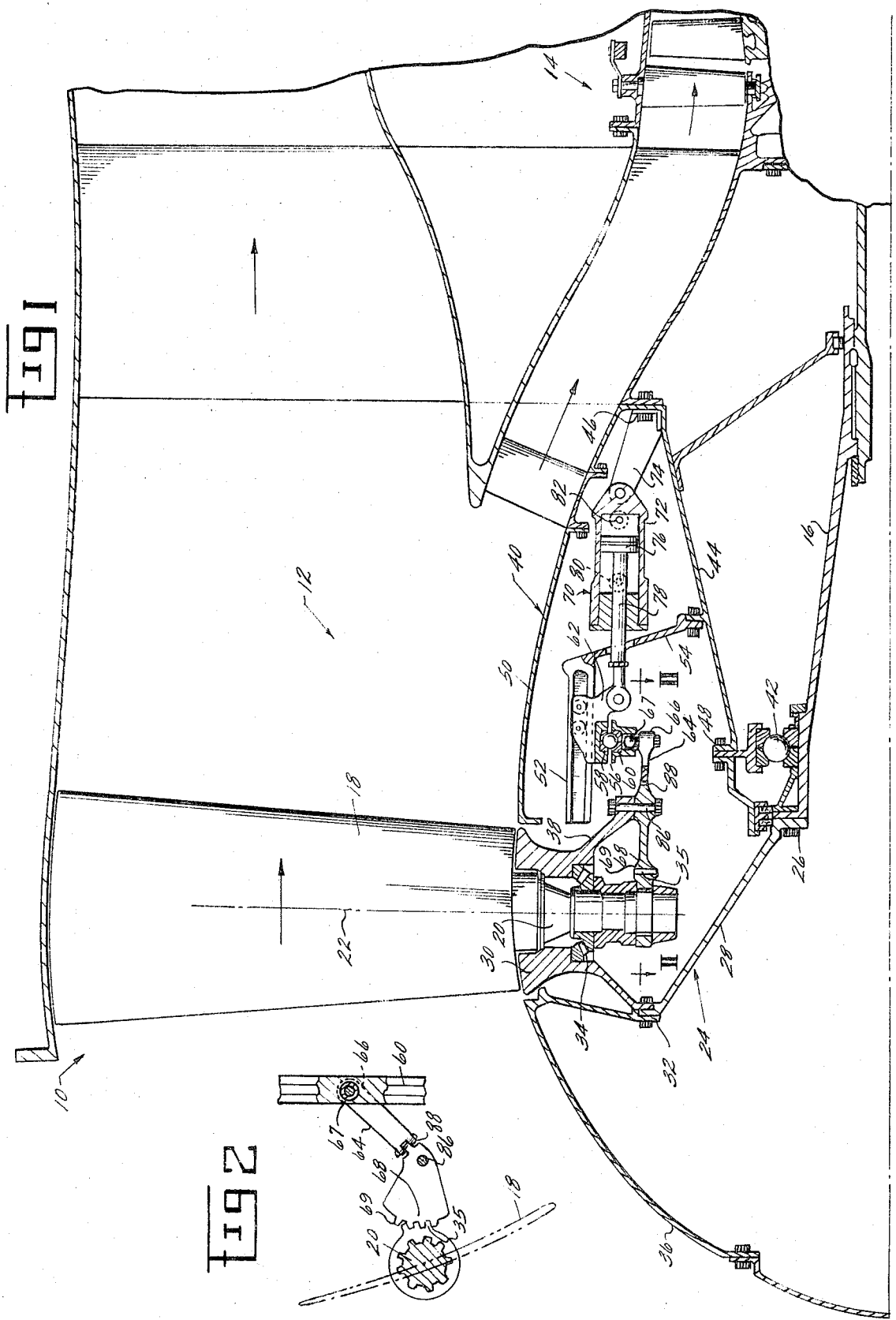

FAN WITH VARIABLE PITCH BLADES AND TRANSLATING BEARING ACTUATION SYSTEM

BACKGROUND OF THE INVENTION

1. Field of the Invention

This invention relates to fans for gas turbines and more particularly to such fans having variable-pitch blades.

2. Description of the Prior Art

Those who provide gas turbines for powering aircraft are constantly engaged in finding ways to improve the efficiency of such gas turbines so that greater thrust is available for powering the aircraft at little or no increase in weight in the gas turbine itself. One way to accomplish this result which has been widely recognized is the use of a gas turbine having a core engine and a fan driven by the core engine. Further efficiency is obtained by providing such a fan with variable pitch blading so that the flow characteristics of the fan may be varied in order to optimize fan operation at all modes of flight of the aircraft.

However, a problem which must always be overcome when providing a fan with variable pitch blading is the transmission of actuation motion between the stationary structure of the gas turbine and the rotating fan blades. One way to overcome this problem is to provide a bearing having one race attached to the stationary structure in a manner which prevents the race from rotating, but permits its axial movement. The other race of the bearing is secured to the fan blades by a linkage which changes the blades' pitch in response to axial movement of the bearing. Actuation means for supplying the actuation motion cooperates with that bearing race which is attached to the stationary structure, thus enabling the blades' pitch to be changed. In such an arrangement, the bearing serves as the interface between the stationary structure and the rotating fan blades.

Such use of a bearing as an interface between rotating variable-pitch blading and stationary structure in which the fan is mounted is known to those skilled in the art, an example of which use is shown in U.S. Pat. No. 3,173,343, issued in the name of P. J. A. Berry. In the Berry patent, a fan having variable-pitch blades is mounted to a solid fan shaft which is cylindrical and circular in cross-section. The fan shaft is mounted at its ends for rotation by bearings. Between one end of the fan shaft and the fan, a sleeve circumscribes the fan shaft and is supported thereby to be movably axially relative thereto. A plurality of link arms are provided, each connected at one end to one of the fan blades and at the other end to the sleeve, so that axial movement of the sleeve changes the pitch of the fan blades. Circumscribing the sleeve and coaxial therewith, a cylinder is provided. The cylinder cooperates with an actuator which moves the cylinder axially with respect to the fan shaft. A bearing is interposed between the sleeve and cylinder and the inner race of the bearing rotates with the sleeve while the outer race of the bearing is secured to the non-rotating cylinder. As the cylinder is moved axially by the actuator, the sleeve moves therewith and the link arms thus change the pitch of the fan blades.

Structure such as that shown in the Berry patent is unsuitable for use in a gas turbine, however. The sleeve and cylinder, which cooperate with the bearing races, are supported by the fan shaft. In a gas turbine, the region near the fan shaft is often quite crowded with other components, so that the use of the fan shaft to support the bearing would complicate the design of the gas turbine. Further, the placement of the main bearing supporting the fan shaft for rotation is often dependent on several design criteria, such as vibration characteristics of the gas turbine or stresses on the fan shaft which vary with the axial placement of such bearings. In order to have the sleeve and cylinder of the Berry patent, optimum placement of the main bearing would have to be sacrificed. Still another factor which militates against the use of the structure shown in the Berry patent in gas turbine applications is the shape of the fan shaft in such application. In gas turbines, the fan shaft is rarely cylindrical, and the sleeve of the Berry patent requires such since it must slide axially along the fan shaft. Also the use of the fan shaft to support the axially movable bearing requires structure to transmit the axial motion of the bearing outer race to the blades, which are spaced radially from the fan shaft. In the Berry patent, this is accomplished by providing each blade with a shaft which extends radially to a location proximate to the fan shaft. Such structure in a gas turbine would be unacceptable from an overall weight standpoint, while the additional centrifugal loading which it causes would provide problems also.

The present invention is particularly adapted for use with a fan of the type used with a gas turbine since the bearing used as the interface between the rotating and stationary structure is supported by the stationary structure. By supporting the bearing by the stationary structure instead of the fan shaft, the main design criteria of the fan and fan shaft may be satisfied without regard to the structure used to provide pitch variation.

SUMMARY OF THE INVENTION

It is a general object of the present invention to provide variable-pitch blading in a fan of the type used in a gas turbine having a core engine driving the fan.

Accordingly, the present invention includes a plurality of variable pitch blades which are suitably mounted to a fan shaft. An annular casing mounts the fan shaft for rotation and track means which are spaced radially from the fan shaft are secured to the annular casing. A bearing which is supported radially by the track means has a first race which is axially movable with respect to the track means. The bearing also has a second race which cooperates with a linkage means to vary the pitch of the blades in response to axial movement of the bearing.

DETAILED DESCRIPTION OF THE DRAWINGS

A more complete understanding of this invention may be had by reference to the specification when taken in conjunction with the accompanying drawings, wherein:

FIG. 1 is a schematic cross sectional view of a fan of the type used in a gas turbine and incorporating the present invention.

FIG. 2 is a cross sectional view taken along lines II—II of FIG. 1.

DETAILED DESCRIPTION OF THE INVENTION

Referring now to FIG. 1 a gas turbine 10 has a fan 12 and a core engine 14 which drives the fan through fan shaft 16.

Fan 12 has a plurality of blades 18 (only one of which is shown for clarity), each of which blades 18 includes a blade trunnion 20, each blade 18 and blade trunnion 20 having a common axis 22. A disc means 24 is suitably mounted to fan shaft 16, as by bolts 26, so that disc means 24 rotates with fan shaft 16. Disc means 24 includes a cone 28 and a ring 30 which is suitably mounted to cone 28, as at flanges 32. Each blade trunnion 20 is mounted for rotation, about its axis 22, in ring 30 by a bearing 34, there being one bearing 34 for each blade trunnion 20. The inner end of each trunnion 20 includes a trunnion gear segment 35, arcuate movement of which trunnion gear segment 35 changes the pitch of blade 18. Disc means 24 may also include a spinner 36 which is mounted to cone 28 at flanges 32, but those skilled in the art will recognize that spinner 36 may also be suitably mounted to the stationary structure of fan 12 without departing from the spirit of the invention. Disc means 24 also includes a frusto-conical portion 38 (only one of which is shown for clarity) which portion 38 extends radially inwardly from ring 30.

An annular casing 40 mounts fan shaft 16 for rotation by a bearing 42. Casing 40 includes fan shaft mounting structure which is a frusto-conical portion 44 having a downstream end terminating in a flange 46 and an upstream end 48 in which bearing 42 is mounted. Flange 46 is secured to the casing of core engine 14, thus securely mounting bearing 42 to the casing of core engine 14. Casing 40 also includes an outer non-structural portion 50 which directs airflow through fan 12.

Three track members 52 (only one of which is shown for clarity) are secured by cone 54 to frusto-conical portion 44 of casing 40. The number of track members 52 which is used is of course a matter of choice, three being used herein by way of example only. Track members 52 comprise a track means which is spaced radially from fan shaft 16 and is supported by casing 40. Those skilled in the art will recognize that track members 52 could be mounted to outer portion 50 without departing from the spirit of the invention, but it has been found to be more advantageous to mount them to frusto-conical portion 44 since mounting them in this manner will enable track members 52 to expand thermally with casing 44 in order to minimize the amount of dimensional tolerance necessary to accommodate such thermal expansion.

A bearing 56 which has a first, outer race 58 and a second, inner race 60 is supported radially from each track member 52 by a carriage 62, there being a corresponding carriage 62 for each track member 52. Each carriage 62 is suitably mounted by rollers in one of track members 52 so that carriages 62 will freely translate axially with respect to track members 52. Carriages 62 are suitably secured to outer race 58 so that as carriages 62 translate axially, bearing 56 also translates axially.

A linkage means includes a plurality of link arms 64 equal in number to the number of blades 18. Each link arm 64 includes a first end 66 which is pivotably mounted to inner race 60 of bearing 56, as at spherical bearing 67. The second end 68 of each link arm 64 terminates in a link gear segment 69 which cooperates with trunnion gear segment 35 on blade trunnion 20.

Actuation means is provided for moving carriages 62 axially. The actuation means includes three hydraulic actuators 70 (only one of which is shown for clarity), each of which cooperates with one of carriages 62. Each hydraulic actuator includes a cylinder 72 which is suitably mounted to casing 40, as by bolting arm 74 to flange 46. Each hydraulic actuator 70 also includes a piston 76 to which one end of an actuator rod 78 is connected, the other end of actuator rod 78 being connected to one of carriage members 62 so that selective introduction of hydraulic fluid into ports 80 and 82 will move actuator rod 78 axially, thus translating corresponding carriage 62 axially. Hydraulic actuators 70 are preferably suitably hydraulically interconnected so that they provide synchronized motion of carriages 62 in order to prevent binding during motion.

Referring now to FIG. 2, the interconnection of bearing 56, link arm 64, and blade trunnion 20 is more clearly shown. Inner race 60 of bearing 56 is shown pivoted to link arm 64 at first end 66. Link gear segment 69 meshes with trunnion gear segment 35 to transmit arcuate motion between link arm 64 and blade trunnion 20. Intermediate its first and second ends, each link arm 64 is pivotably mounted to pivot arm 38 at pivot point 86. Each link arm further includes a clevis joint 88 interposed between spherical bearing 67 and pivot point 86.

In operation, fan shaft 16 is rotated by core engine 14, thus rotating disc means 24 and blades 18. The linkage means rotates with disc means 24 and inner race 60 of bearing 56, which is connected to the linkage means, also rotates. The outer race of bearing 56 is secured to carriages 62, which in turn are supported by track members 52 so that carriages 62 are rotationally fixed but remain axially movable relative to track members 52. When it is desired to change the pitch of blades 18, fluid is introduced into a suitable one of ports 80 or 82 of actuator 70, and actuator rods 78 move carriages 62 axially. Link arms 64 thus rotate about their respective pivot points 86, moving link gear segments 69 arcuately, and rotating blade trunnion 20. Rotation of blade trunnion 20 changes the pitch of blades 18. The axial movement of carriages 62 required to change the pitch of blades 18 produces circumferential movement of the first end 66 of each link arm 64 relative to its corresponding pivot point 86, as is best seen in FIG. 2. This relative circumferential movement produces a corresponding relative radial displacement. Each spherical bearing 67 and corresponding clevis joint 88 cooperate to permit such relative radial displacement without binding during arcuate movement of link arm 64.

The use of multiple hydraulic actuators makes the present invention particularly adapted to gas turbines used to power aircraft because should one of actuators 70 fail, the pitch of blades 18 still may be maintained, or depending on the number of actuators 70 used, changed.

It is clear from the foregoing, that use of the present invention provides for varying the pitch of fan blades in a fan of the type used in a gas turbine having a core engine driving the fan. It is particularly adapted to such applications, since the bearing used as the interface between the fixed and rotating structure is supported independently of the fan shaft and thus can be spaced radially from the fan shaft to save weight and adapt to inclusion with a gas turbine of conventional construction.

Although only one specific embodiment of the invention has been shown, those skilled in the art will perceive modifications other than those specifically pointed out which can be made without departing from the invention, and it is intended by the appended claims to cover all such modifications as fall within the true spirit and scope of the invention.

What is claimed as new and desired to be secured by Letters Patent of the United States is:

1. A fan of the type used in a gas turbine having a core engine driving the fan through a fan shaft, the fan comprising:
   a. a plurality of variable-pitch blades mounted to said fan shaft;
   b. an annular casing for mounting said fan shaft for rotation;
   c. track means spaced radially from said fan shaft and cooperating with said casing;
   d. a bearing cooperating with said track means, wherein said bearing includes a first bearing race axially movable relative to said track means and a second bearing race; and
   e. linkage means for cooperating with said second bearing race and said variable-pitch blades wherein said linkage means varies the pitch of said blades in response to axial movement of said first bearing race relative to said track means.

2. The fan recited in claim 1 further including actuation means for moving said second bearing race axially relative to said track means.

3. The fan recited in claim 1 wherein said bearing further includes an outer race comprising said first bearing race and an inner race comprising said second bearing race.

4. The fan recited in claim 3 wherein:
   a. said track means includes a plurality of track members disposed at equal circumferential intervals about said casing; and
   b. said bearing further includes a plurality of carriages corresponding in number to said plurality of track members, wherein each said carriage is secured to said outer race, is radially supported by said corresponding track member and is axially movable relative to said corresponding track member.

5. The fan recited in claim 4 further including a plurality of actuators corresponding in number to said plurality of carriage members, wherein each said carriage is moved axially relative to said corresponding track member by said corresponding actuator.

6. The fan recited in claim 5 wherein said actuators are of the hydraulic type and are hydraulically interconnected for providing synchronized motion of said carriages.

7. The fan recited in claim 6 wherein said plurality of track members is three in number.

8. The fan recited in claim 1 wherein said annular casing includes:
   a. flange means for mounting said casing to said core engine;
   b. fan shaft mounting structure for mounting said fan shaft for rotation, wherein said fan shaft mounting structure is secured to said flange means and said track means is secured to said fan shaft mounting structure.

9. The fan recited in claim 8 wherein said fan shaft mounting structure is frusto-conical and has a downstream end and an upstream end wherein said flange means is secured to said downstream end, said fan shaft is mounted for rotation by said upstream end and said track means is secured intermediate of said upstream and downstream ends.

10. A fan of the type recited in claim 1 further comprising a disc means mounted to said fan shaft wherein:
   a. each said variable pitch blade includes a blade trunnion coaxial with said blade wherein rotation of said blade trunnion about its axis varies the pitch of said blade;
   b. each said blade trunnion is mounted to said disc means for rotation about said blade trunnion axis and includes a trunnion gear means; and
   c. said linkage means includes a plurality of link arms corresponding in number to said plurality of variable pitch blades wherein each said link arm is pivoted to said disc means and has a first end pivotably mounted to said second bearing race, and a second end terminating in a link arm gear segment wherein each said link arm gear segment cooperates with said corresponding trunnion gear segment.

* * * * *